US010498680B2

(12) United States Patent
Mahood et al.

(10) Patent No.: US 10,498,680 B2
(45) Date of Patent: *Dec. 3, 2019

(54) CONVERSATION ENRICHMENT THROUGH COMPONENT RE-ORDER

(71) Applicant: Microsoft Technology Licensing, LLC, Redmond, WA (US)

(72) Inventors: Justin Mahood, Seattle, WA (US); David De La Brena, Redmond, WA (US); Tali Roth, Kirkland, WA (US); Jared Ivey, Kirkland, WA (US); Aditi Desai, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/110,460

(22) Filed: Aug. 23, 2018

(65) Prior Publication Data

US 2018/0367486 A1    Dec. 20, 2018

Related U.S. Application Data

(63) Continuation of application No. 15/244,490, filed on Aug. 23, 2016, now Pat. No. 10,084,736.

(51) Int. Cl.
| G06F 15/16 | (2006.01) |
| H04L 12/58 | (2006.01) |
| G06F 17/27 | (2006.01) |
| G06F 17/21 | (2006.01) |
| G06F 17/22 | (2006.01) |

(52) U.S. Cl.
CPC .......... *H04L 51/16* (2013.01); *G06F 17/212* (2013.01); *G06F 17/2264* (2013.01); *G06F 17/2705* (2013.01); *G06F 17/279* (2013.01)

(58) Field of Classification Search
USPC ........................................................ 709/206
See application file for complete search history.

(56) References Cited

U.S. PATENT DOCUMENTS

2008/0281823 A1* 11/2008 Chen .................... G06Q 10/107

FOREIGN PATENT DOCUMENTS

EP            2369820 A2 *   9/2011   ........ H04M 1/72547

OTHER PUBLICATIONS

"Office Action Issued in European Patent Application No. 16758066. 1", dated Jan. 28, 2019, 5 Pages.

(Continued)

*Primary Examiner* — Hee Soo Kim
(74) *Attorney, Agent, or Firm* — Michael Best & Friedrich LLP

(57) ABSTRACT

Technologies are described for chronological re-ordering of transmitted conversation components. A message transmitting a message chain in the conversation through a forward or reply action, or addition of a new participant may be kept at the top and the remainder of messages may be re-ordered in chronological order. In some examples, the displayed properties (metadata) or header information may be normalized, that is displayed in a consistent manner. In other examples, flat header information (textual data) may be analyzed and enriched. Thus, the header information may be presented with interactive features such as presence information, calendar presentation, and comparable ones.

19 Claims, 14 Drawing Sheets

(56) References Cited

OTHER PUBLICATIONS

"Office Action Issued in European Patent Application No. 16758066.1", dated Jun. 14, 2019, 5 Pages.
"Office Action Issued in European Patent Application No. 16758031.5", dated Sep. 9, 2019, 3 Pages.

* cited by examiner

CONVERSATION ENRICHMENT THROUGH COMPONENT RE-ORDER

RELATED APPLICATIONS

This application is a continuation of U.S. patent application Ser. No. 15/244,490 filed Aug. 23, 2016, the entire content of which is incorporated by reference herein.

BACKGROUND

Communication applications provide the ability to exchange information over a multitude of modes. Email exchange, video conferences, audio calls, text or video messaging, desktop sharing, application sharing are some examples. In addition to providing the ability for instantaneous communication, such applications also enable users to maintain records of these conversations through an email chain, online conference recording, etc.

Thus, an email conversation that spans a long period of time and a large number of participants is not uncommon. While such records are useful in determining the context and history of the conversation, their presentation may degrade the user experience and make it difficult to obtain the needed information. For example, an email conversation is typically presented in reverse chronological order (with the most recent email at the top). Thus, a participant in the conversation would have to scroll down all the way to the bottom of the conversation to determine how it started and what the initial discussion included.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to chronological re-ordering of transmitted conversation components. A conversation that includes a sequence of messages being transmitted in a new message may be detected and analyzed to determine individual messages within the conversation. Non-content information associated with the individual messages may be parsed. The sequence of messages may be re-ordered by reversing a chronological order of the individual messages except for the new message and preserving a placement of the new message at a top of the sequence of messages. One or more interactive elements may be inserted into the conversation based on the parsed non-content information to one or more individual messages, and the new message may be transmitted with the re-ordered sequence of messages to one or more recipients.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
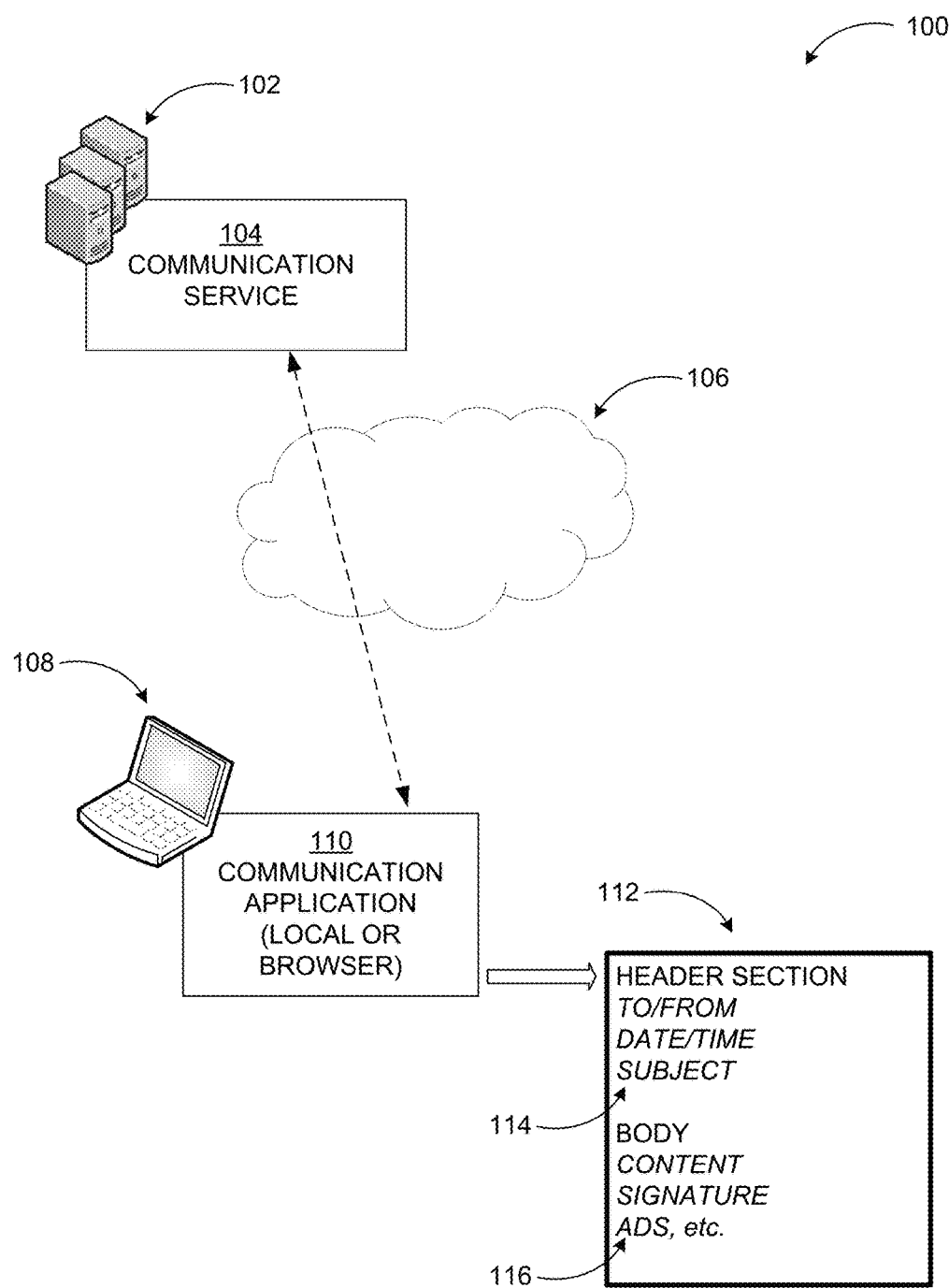
FIG. 1 includes an example system, where conversation modification for enhanced user experience may be implemented.

As briefly described above, a communication application or service may modify conversation presentation for enhanced user experience. Parts or components of the conversation may be detected and analyzed for their properties (metadata) such as who sent a message, who received, when, was anyone left out from or added to the conversation, etc. The extracted properties and analyzed information may then be used to reverse a chronological order of the conversation and present it using interactive features such as collapsing and expanding parts of the presented information, providing a summary, removing unnecessary content, and comparable features. In some examples, a message sending the message chain in the conversation through a forward or reply action, or addition of a new participant may be kept at the top and the remainder of messages may be re-ordered in chronological order. In other examples, the displayed properties (metadata) or header information may be normalized, that is displayed in a consistent manner. In further examples, flat header information (textual data) may be analyzed and enriched. Thus, the header information may be presented with interactive features such as presence information, calendar presentation, etc.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for modification of conversation presentation for enhanced user experience. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Example embodiments are described herein using email conversations. Embodiments are not limited to email conversations, however. Other forms of conversations, where records are maintained in chronological order such as online conference recordings, desktop sharing sessions, text or video messaging sessions, and similar ones may also be modified for enhanced user experience using the principles discussed herein.

FIG. 1 includes an example system, where conversation modification for enhanced user experience may be implemented.

As shown in diagram 100, a communication application 110 may be a local application executed on a computing device 108 and facilitate multi-modal communications with other communication applications in a distributed manner over one or more networks such as network 106. In other embodiments, a communication service 104 executed on one or more servers 102 may manage the communications and users may access the service through client applications such as communication application 110. In yet other embodiments, the communication service 104 may be accessed through thin clients, i.e., browsers. The device 102 may include a desktop computer, a laptop computer, a tablet computer, a vehicle mount computer, a smart phone, or a wearable computing device, among other similar devices.

The multi-modal communications may include email exchange, video conferences, audio calls, text or video messaging, desktop sharing, application sharing, and comparable modes. In some modes or combinations of communications modes, the communication may span over a period of time (hours, days, weeks) and involve multiple people. Such communications may be managed and maintained as a conversation. The conversation record may include a flow of communications (content), participants, timings, and other properties associated with the individual communication sessions within the conversation. The conversation may be presented to participants with its content ordered in chronological order such that an oldest communication is at the bottom and a newest at the top. For example, an email conversation 112 may be presented as a connected series of emails with the individual messages on top of each other in the chronological order. Each message may include a header section 114 that includes a sender and recipient(s), date and time of the message, and a subject of the message. Each message may also include a body section 116 that includes the content of the message, an optional signature block, and optionally advertisements, inspirational messages, etc.

Thus, in an example email conversation, a user may see the newest message first and have to scroll to the bottom of the presented conversation to understand the beginning and a context of the conversation. Furthermore, repeated subject lines (in a typical conversation, the subject line may not be changed as messages are sent back and forth through replies or forwards), participant lists, dates, signature blocks, etc. may distract the user from the flow of the content. Indeed, the repetitive display of the information may render the properties of the conversation to be less obvious.

Figure 2A:
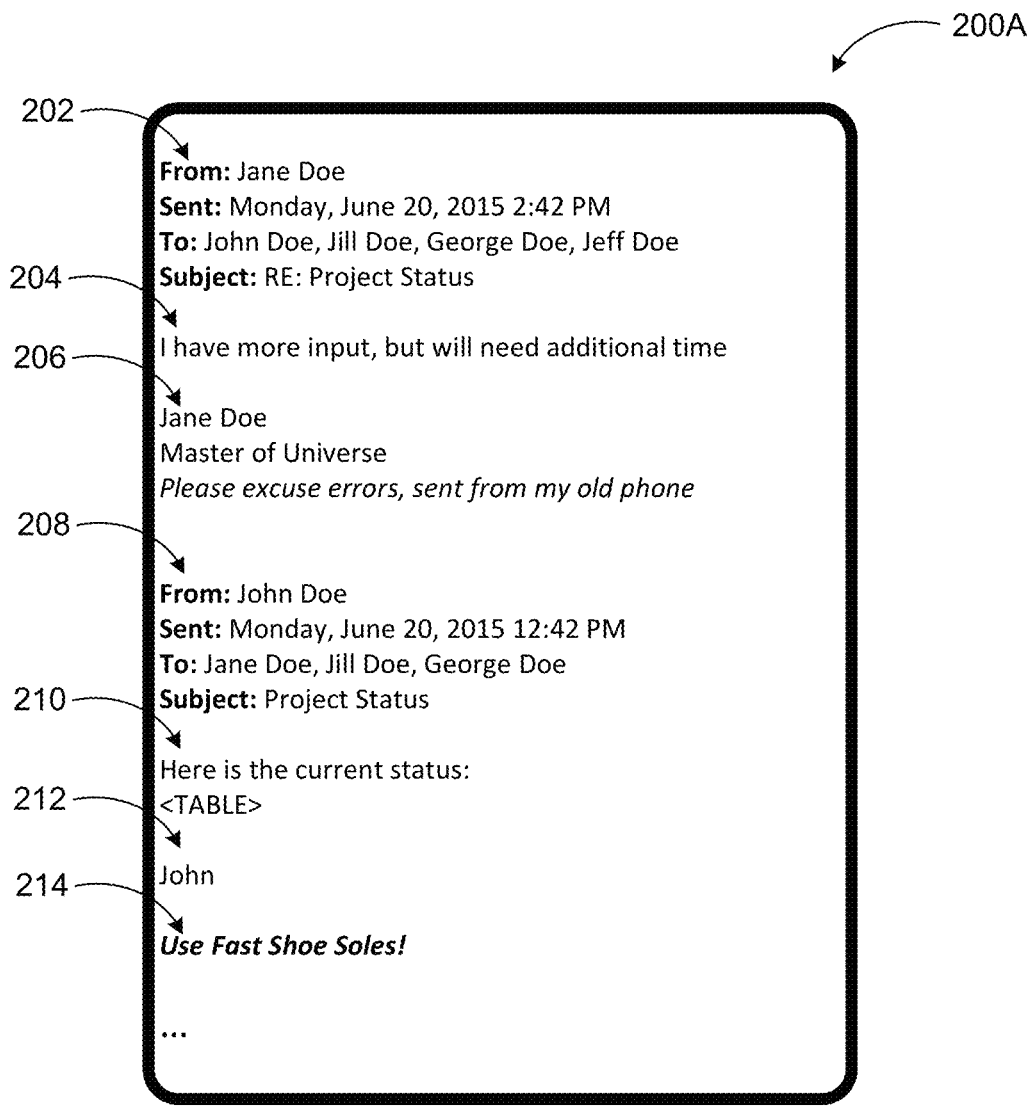
FIG. 2A illustrates an email conversation with example messages.

FIG. 2A illustrates an email conversation with example messages.

Example email conversation presentation 200A is shown with two example messages. The example conversation starts with the newest (i.e., most recent) message at the top and goes chronologically toward the oldest (i.e., least recent) message at the bottom. The top message includes a header section 202 listing a sender and recipients of that message, date and time of when it was sent, and a subject line. The top message also includes a body section 204 that includes the actual message from the sender, and a signature block 206.

The second message, or the next recent one, includes header section 208 with similar information to the header section 202 of the top message, and a body section 210. Instead of the signature block, the second message includes the name of the sender 212 (may be typed by the sender as part of the body section) and an advertisement 214, which may be inserted automatically by the email service provider of the sender. The conversation may be in html format (including tags and other properties) or text format (no metadata).

As discussed above, the repeated header sections, signature block, advertisement, or even the typed name of a sender can distract a reader from the content flow of the conversation. Also, the reader may have to scroll through a lengthy conversation to understand the context of the conversation (when and how it started). Furthermore, changes in the conversation such as who was added when, who was left out by whom and when, etc. may not be easily detectable from the repetitive and similar looking header sections.

Figure 2B:
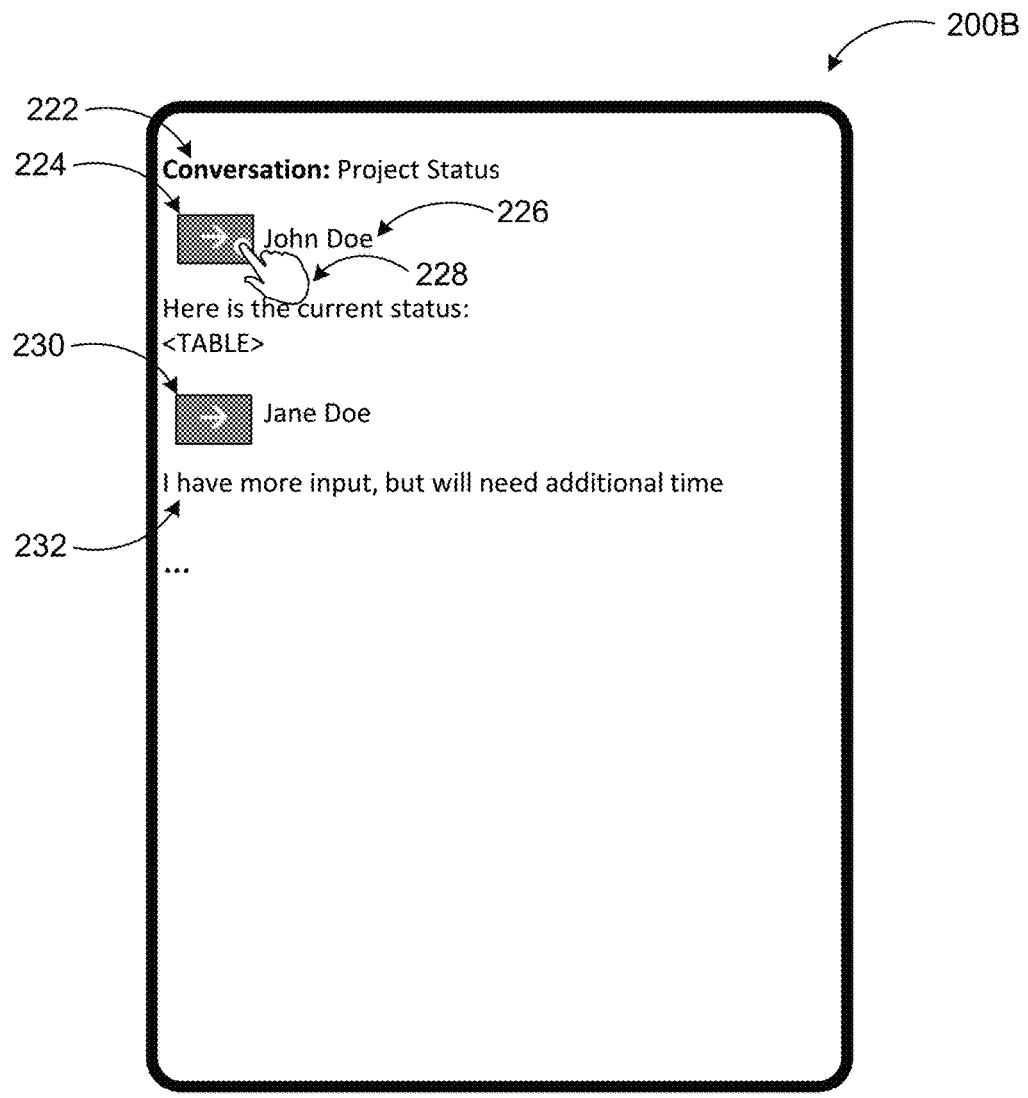
FIG. 2B and 2C illustrate different presentations of the email conversation of FIG. 2A in a system according to embodiments.
Figure 2C:
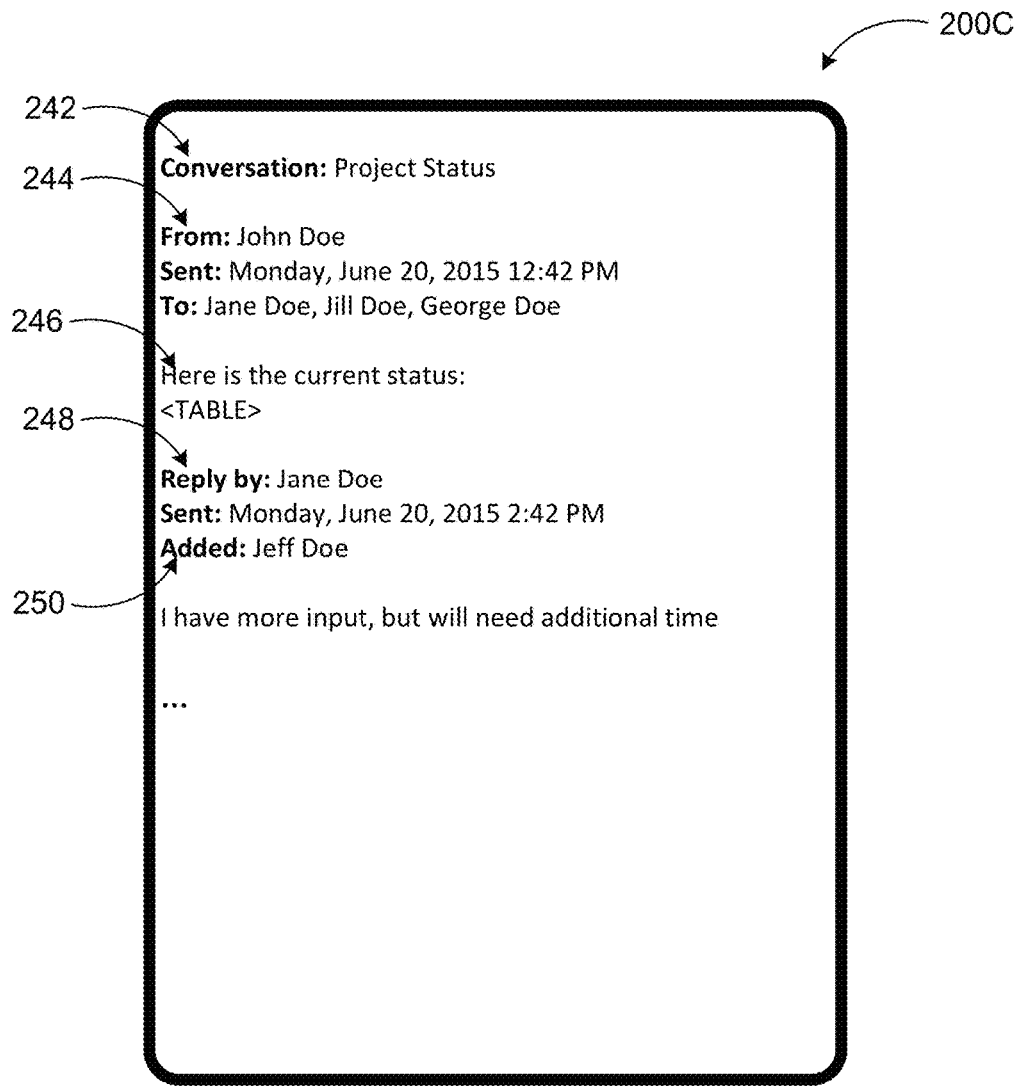

FIG. 2B and 2C illustrate different presentations of the email conversation of FIG. 2A in a system according to embodiments.

In the example conversation presentation 200B, the conversation 222 is identified and a chronological order of the messages reversed such that the second (older) message is displayed on top and the newer message is displayed at the bottom. The messages are presented in a collapsed manner, where the senders (e.g., first sender 226) and the content of each message (e.g., body 232) are displayed. Expansion controls 224 and 230 may be presented such that details of individual messages can be displayed upon activation 228 of a control. Details may be presented temporarily or in a persistent manner upon activation of the expansion controls 224 and 230.

To arrive in example conversation presentation 200B, a conversation module within a communication application or service may analyze the conversation to determine individual messages within the conversation and parse properties associated with the individual messages. The properties may include a date and time of each individual message, a sender of each individual message, recipients of each individual message, added participants, removed participants, attachments, and/or other properties. The conversation module may then determine one or more interactive features to be presented based on the parsed properties. The interactive features may include, for example, collapsing and expanding all individual messages, collapsing and expanding select individual messages, providing a summary of the conversation, emphasizing portions of the conversation, enabling customization of an order of the individual messages, etc.

The conversation module may then reverse a chronological order of the individual messages based on the parsed properties and the conversation with the reversed chronological order and the one or more interactive features may be displayed for participants. The expansion controls 224 and 230 may be associated with individual messages as shown such that individual messages can be collapsed or expanded. In some embodiments, one or more expansion controls may be provided to collapse and expand all or groups of messages too. To parse the properties of the individual messages, the conversation module may analyze metadata associated with the messages, tags and other features of html messages, or even content of text messages.

Example conversation presentation 200C shows another configuration, where the individual messages are in a semi expanded state. The conversation is again identified (242) and headers of individual messages 244 and 248 are displayed. But, instead of standard email header, the headers 244 and 248 provide information in a more easily understandable way. For example, header 248 indicates that the second message is a reply by Jane Doe (e.g., as opposed to a forward) and that Jane added Jeff Doe instead of listing all participants. While content of the individual messages such as body 246 of the first message is displayed, signature blocks, advertisements, etc. are still removed to prevent distraction.

Figure 3:
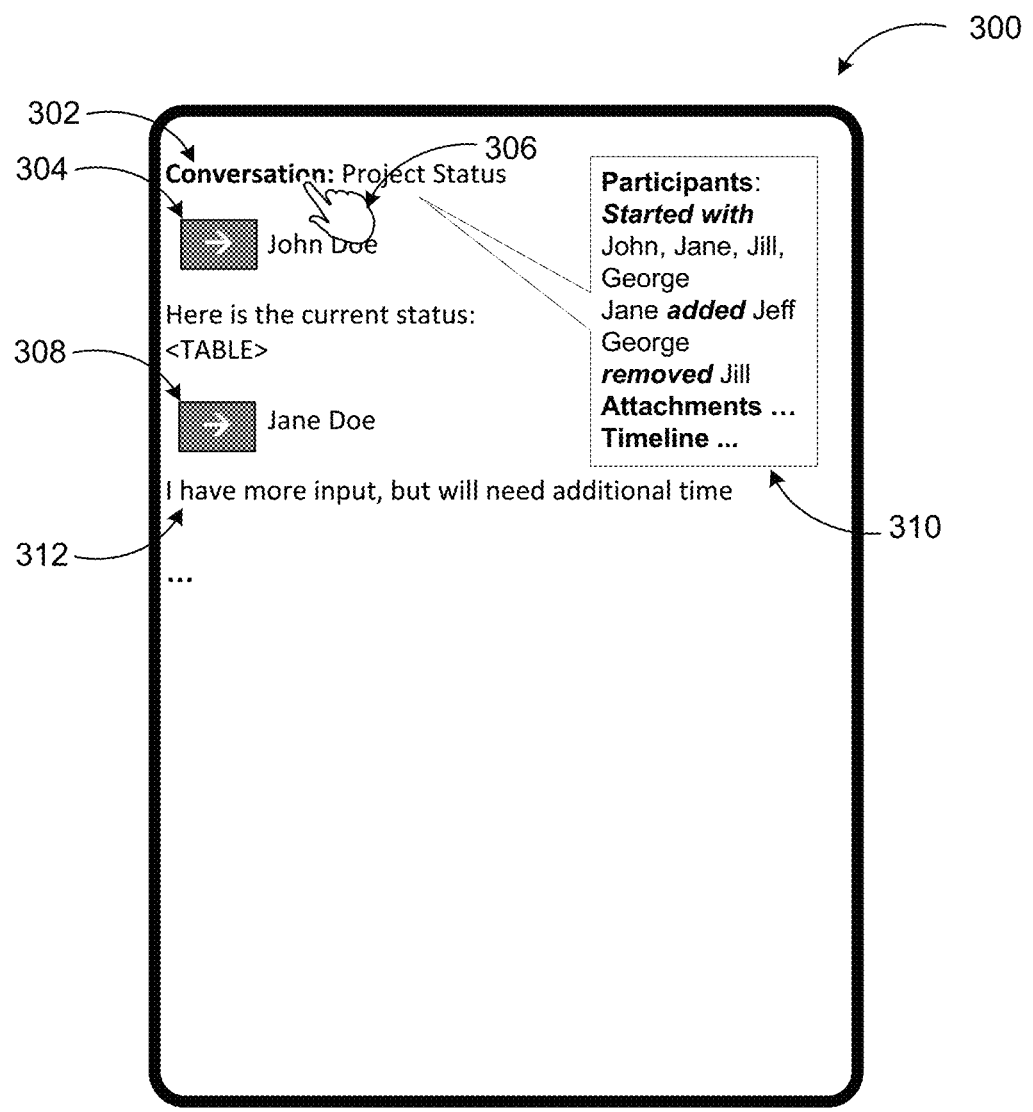
FIG. 3 illustrates another presentation of the email conversation of FIG. 2A in a system according to embodiments.

FIG. 3 illustrates another presentation of the email conversation of FIG. 2A in a system according to embodiments.

In example conversation presentation 300, the messages are displayed in collapsed state with expansion controls 304 and 308, and their respective content (e.g., body 312). Upon activation of a control such as selection 306 of the conversation identifier 302, a conversation summary 310 may be displayed providing summary information about the conversation. The conversation summary 310 may include further interactive features, which upon activation may cause additional detail information to be displayed.

In some embodiments, graphical, highlighting, textual, color, and/or shading schemes may be employed in the conversation summary or in the displayed conversation to emphasize important parts of the conversation, present information in a more user friendly manner, etc. Furthermore, the display order of the messages may not necessarily be forward or reverse chronological order. Users may be allowed to customize the order of display for messages. For example, a newest message may be displayed at the top followed by the remaining messages in oldest-to-newest chronological order. In yet other embodiments, messages may be grouped, collapsed, expanded, and/or emphasized based on their content and context of the conversation.

As discussed above, a communication application or service providing conversation modification for enhanced user experience may enable reduced processor load (and consequently increased processing speed), conservation of memory, and reduced network bandwidth usage, among other features, that may improve the efficiency and performance of computing devices associated with the facilitated communications. For example, as a result of obtaining summarized information, users may reduce a number of repeated messages. Collapsed information may also be saved in that format reducing a need for data storage and memory. User interaction may also be optimized.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of users and applications.

Figure 4A:
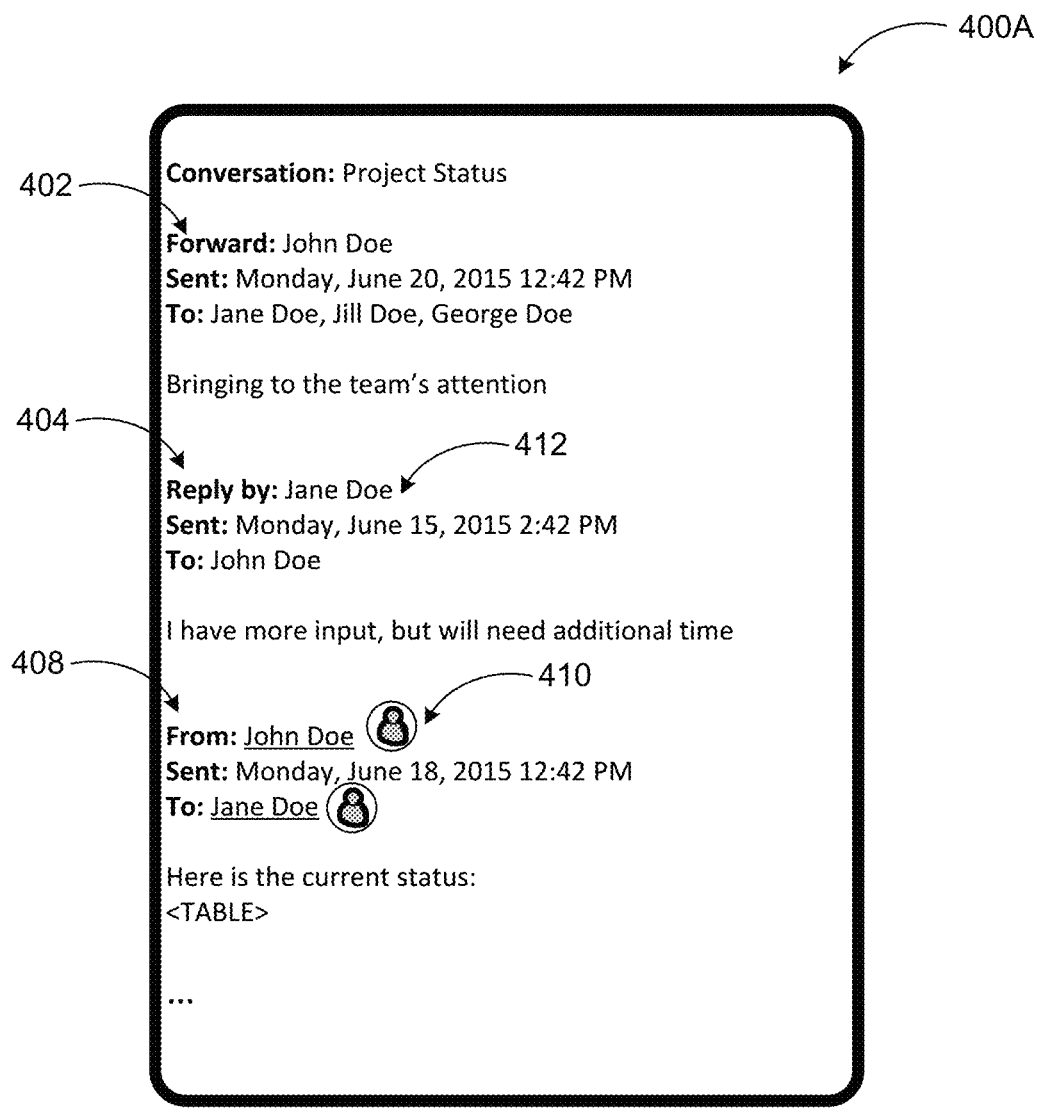
FIG. 4A through 4C illustrate an example chronological re-ordering of conversation components when the conversation is transmitted in a new message and example enrichment features in the re-ordered conversation according to embodiments.
Figure 4B:
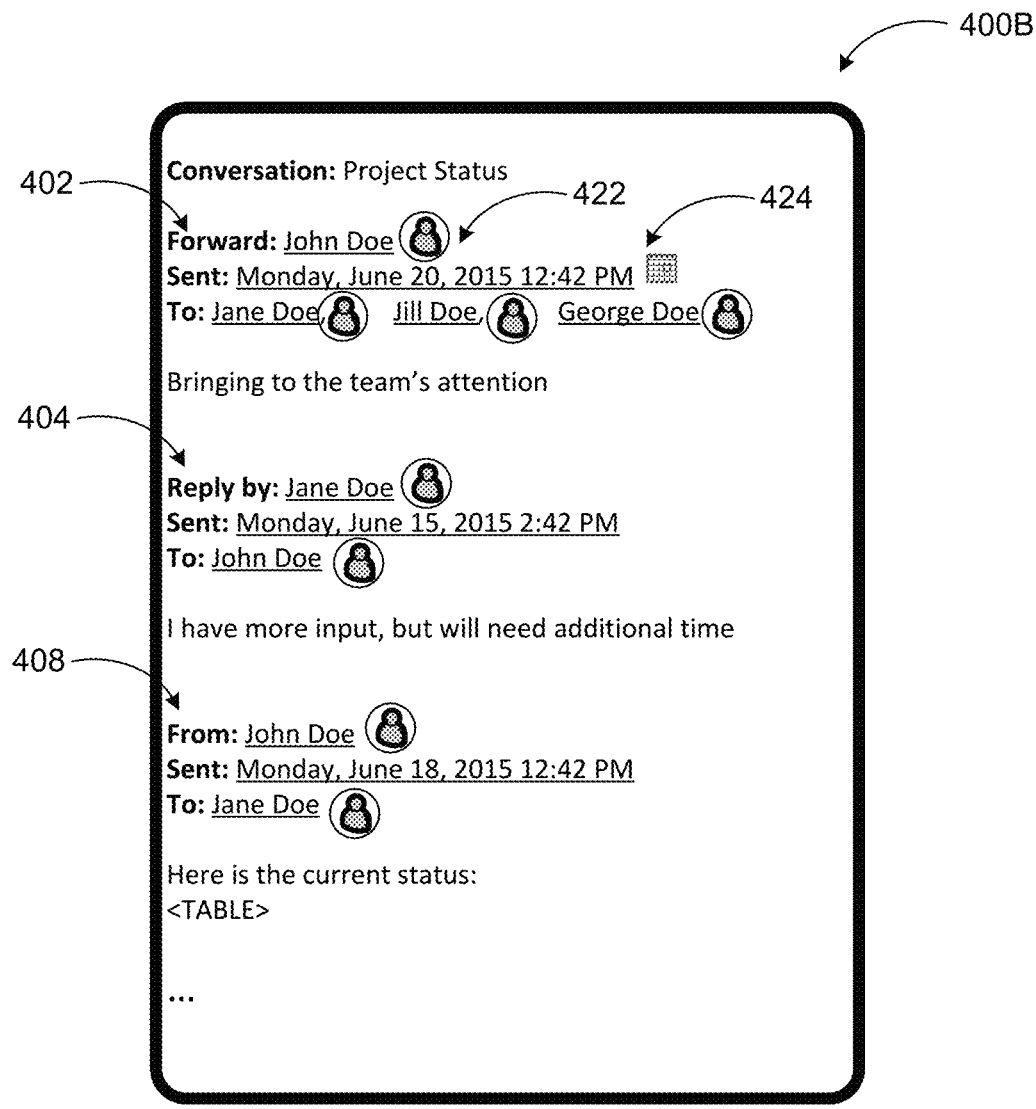
Figure 4C:
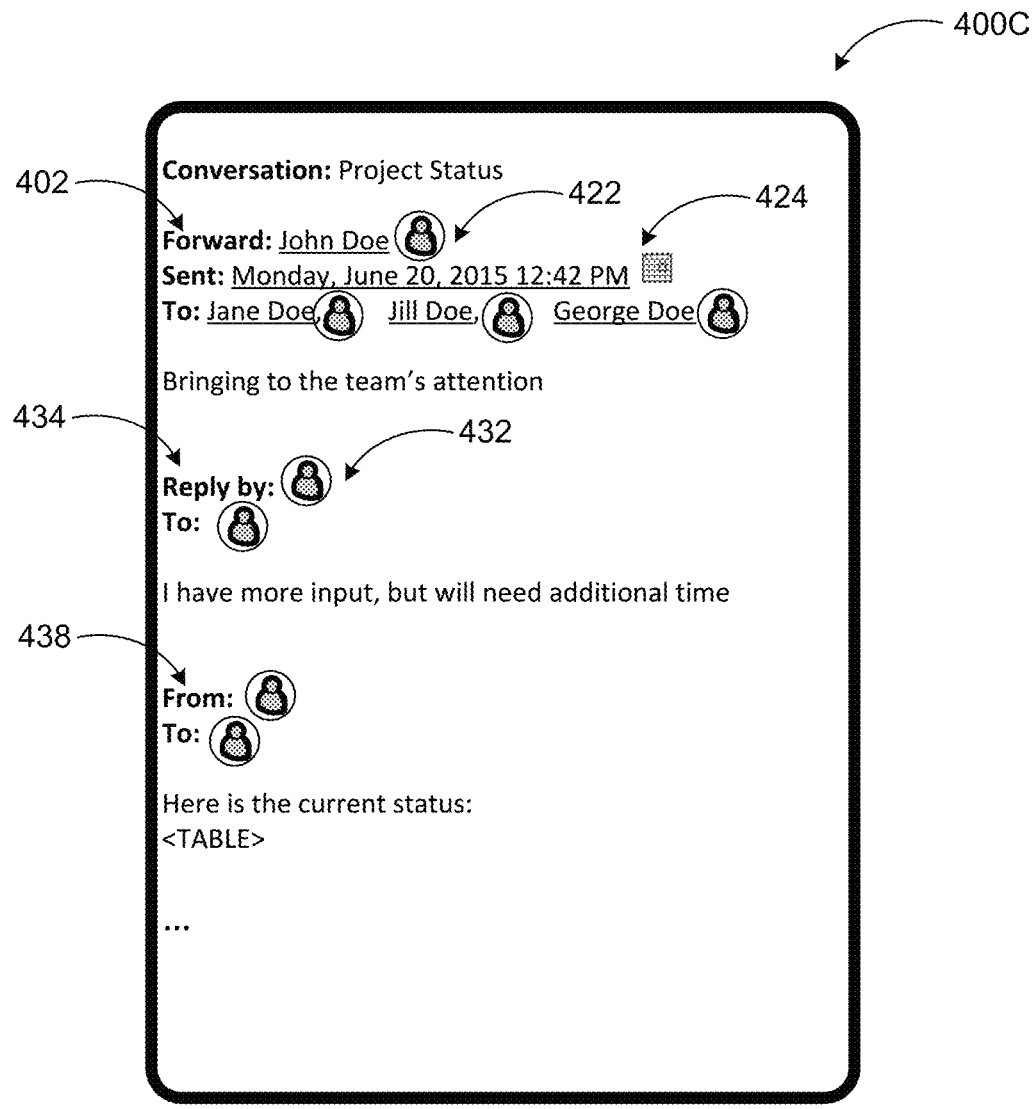

FIG. 4A through 4C illustrate an example chronological re-ordering of conversation components when the conversation is transmitted in a new message and example enrichment features in the re-ordered conversation according to embodiments.

Diagram 400A in FIG. 4A shows re-ordering of messages in a forwarded chain according to some embodiments. In the illustrated example, message 404 may be an original message followed by message 408. Message 402 forwards the entire conversation. In some embodiments, messages 404 and 408 may be re-ordered in chronological order to provide easy following of the flow of the conversation. The latest message (402), however may be placed at the top in order to provide a quick context to a recipient.

In the example conversation of diagram 400A, another aspect of multi-message conversations is also illustrated. Different participants of the conversation may use different applications, some of which may allow rich metadata 410 (header information with interactive features such as presence information) and others may be text-based only (in other words, flat content 412). Other embodiments, as discussed below in conjunction with FIG. 4B may address this potential disparity.

Diagram 400B of FIG. 4B shows a re-ordered conversation with enriched and normalized header information. Messages 402, 404, and 408 are re-ordered chronologically with the newest message (forwarding the conversation) at the top, as in FIG. 4A. A communication service or application according to embodiments may analyze flat header content and "hydrate" or enrich with interactive features. For example, sender and/or recipients' email addresses may be in text form in the original email. The communication service or application may perform a search based on the email address and obtain additional information such as presence information, additional contact information, etc. from internal or external resources (e.g., other conversation or presence services). Similarly, the communication service or application may detect date/time information in text form and retrieve calendar information associated with the participants of the conversation.

The communication service or application may then insert interactive features such as links or similar elements directed to interactive contact cards 422, calendar presentations 424, and so on. For example, a participant may be presented with presence information associated with a sender or recipient of a message in the conversation and multiple communication options to contact the participant upon selecting a respective link or element. Furthermore, additional features such as summary information, collapse/expand elements, and others as discussed herein may also be used in conjunction with the re-ordered messages. In some embodiments, the enriched header information may also be presented in a normalized manner, that is using consistent font, format, order, content, and similar aspects.

Diagram 400C in FIG. 4C shows another example configuration of the use of interactive features. In some examples, all or a portion of the messages in the conversation may be collapsed such as messages 434 and 438 through the use of interactive contact card elements 432. In limited display area environments such as mobile devices, entire or a portion of the content of the re-ordered messages may be displayed with the header portions collapsed to gain display area. Contact card elements 432 may be used to expand sender/recipient information upon user activation. The collapse and expansion of the messages using interactive features may be automatic or manual. For example, the communication service or application may select which messages to collapse or whether to collapse the messages based on a device currently used by a user.

The features, configurations, and aspects of conversation components discussed above are provided for illustration purposes and do not constitute limitation on embodiments. Re-ordered conversation with enrichment features may be implemented using other features, configurations, and aspects of conversation components such as header information, signature or slogan blocks, etc. using the principles described herein.

Figure 5:
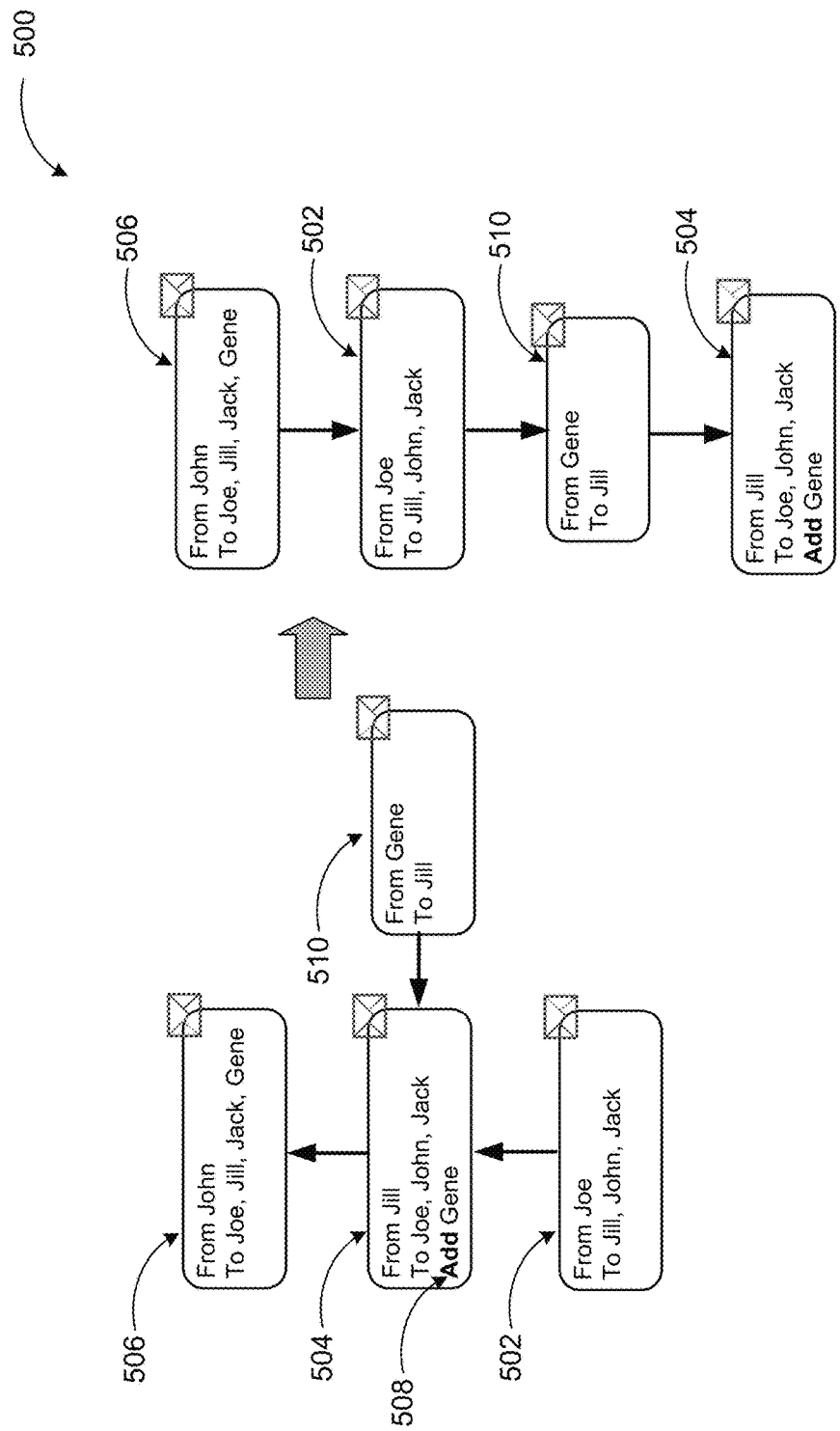
FIG. 5 illustrates conceptually insertion of a new component into a re-ordered conversation upon addition of a new person to the conversation according to embodiments.

FIG. 5 illustrates conceptually insertion of a new component into a re-ordered conversation upon addition of a new person to the conversation according to embodiments.

The example re-ordering of messages scenarios discussed above focus on a forward or reply action based delivery of a conversation. Diagram 500 shows another example scenario, where a new person is added to a conversation with a message that is relevant to the conversation (e.g., on the same subject). In the example scenario of diagram 500, two actions occur in a conversation comprising messages 502, 504, and 506. Message 504 adds a new person (Gene) and message 506 forwards the entire conversation. The added person, Gene, has a message 510 in his history to one of the participants (Jill) that may be related to the conversation.

Thus, the re-ordered conversation is in an order of message 506 (newest message) followed by chronologically ordered (old to new) messages 502, 510, and 504. Message 510 is inserted into the conversation according to its place in the chronology of the messages in the conversation. All or some of the re-ordered messages may also be enriched with interactive features as discussed herein.

Figure 6:
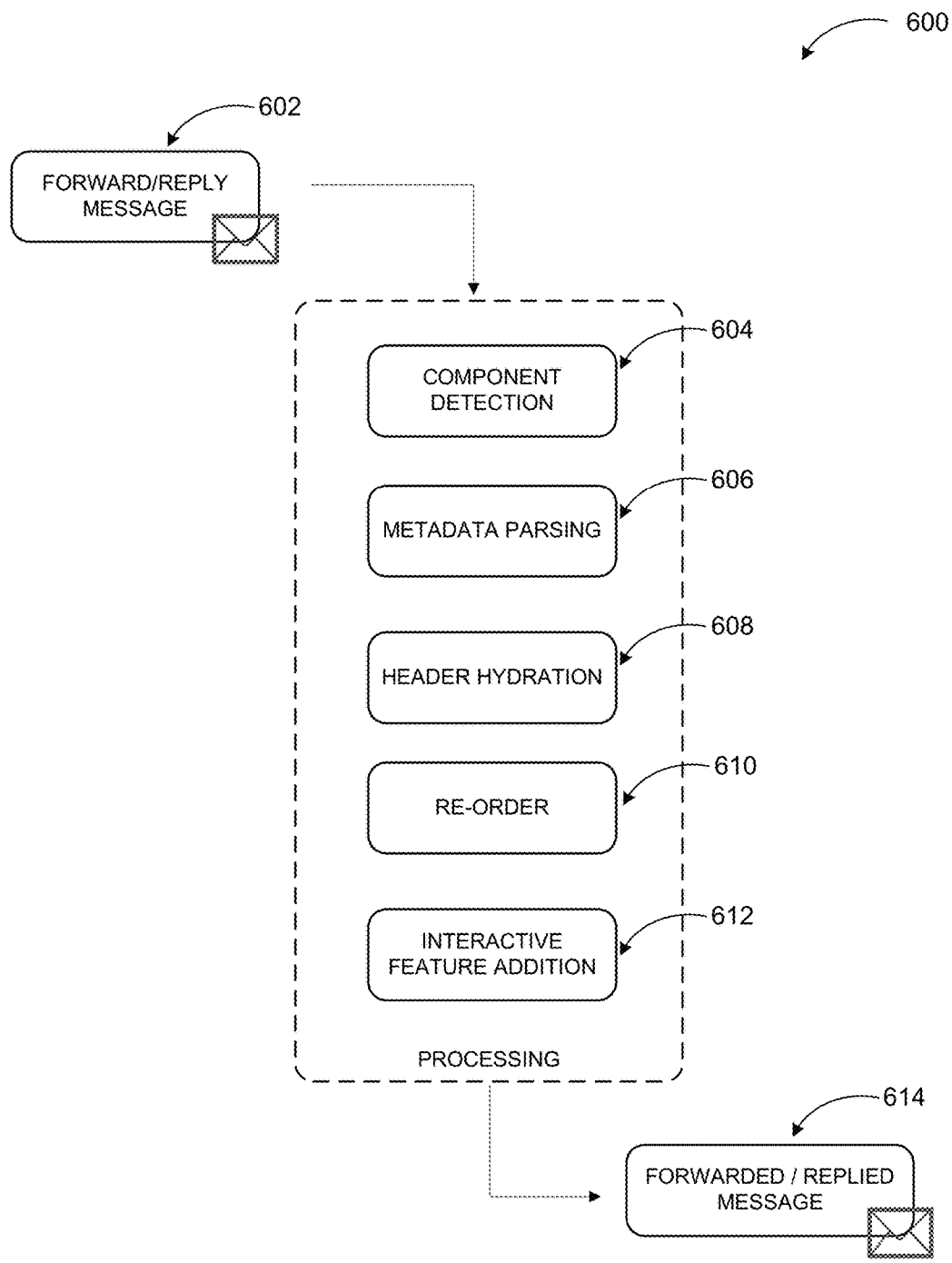
FIG. 6 is a block diagram of major actions in processing a message that includes a re-ordered conversation with enrichment features according to embodiments.

FIG. 6 is a block diagram of major actions in processing a message that includes a re-ordered conversation with enrichment features according to embodiments.

As shown in diagram 500, a forward or reply message 602 that includes a chain of messages as part of a conversation may be processed by a conversation module of a communication service or application. In a component detection phase 604, components of the conversation (individual messages) may be determined based on their metadata, headers, or other aspects such as indentations in the listing of the chain of messages.

At a metadata parsing phase 606, metadata and/or headers of the messages may be analyzed to determine attributes of the individual messages such as sender, recipient(s), send date/time, etc. In case of some messages having flat content (i.e., content and header in text form only without metadata), the conversation module may perform search(es) on the detected information such as email addresses and retrieve additional information to hydrate the flat headers at header hydration phase 608. At re-order phase 610, the messages may be chronologically re-ordered from old to new while keeping the newest message (the forward or reply message 602) being kept at the top of the message chain to provide context to recipients. At interactive feature addition phase 612, interactive features such as rich contact card elements, calendar elements, and similar ones may be added to one or more of the messages in the conversation. Headers and/or content of the messages may also be normalized in regard to font, format, or presentation. The processed (re-ordered) message may then be provided to the recipients as forwarded or replied message 614.

The examples provided in FIGS. 1 through 6 are illustrated with specific services, applications, communication modes, modules, module components, and configurations. Embodiments are not limited to environments according to these examples. Conversation modification for enhanced user experience and a message that includes a re-ordered conversation with enrichment features may be implemented in environments employing fewer or additional services, applications, communication modes, modules, module components, and user experience configurations. Furthermore, the example services, applications, communication modes, modules, module components, and configurations shown in FIG. 1 through 6 may be implemented in a similar manner with other values using the principles described herein.

Figure 7:
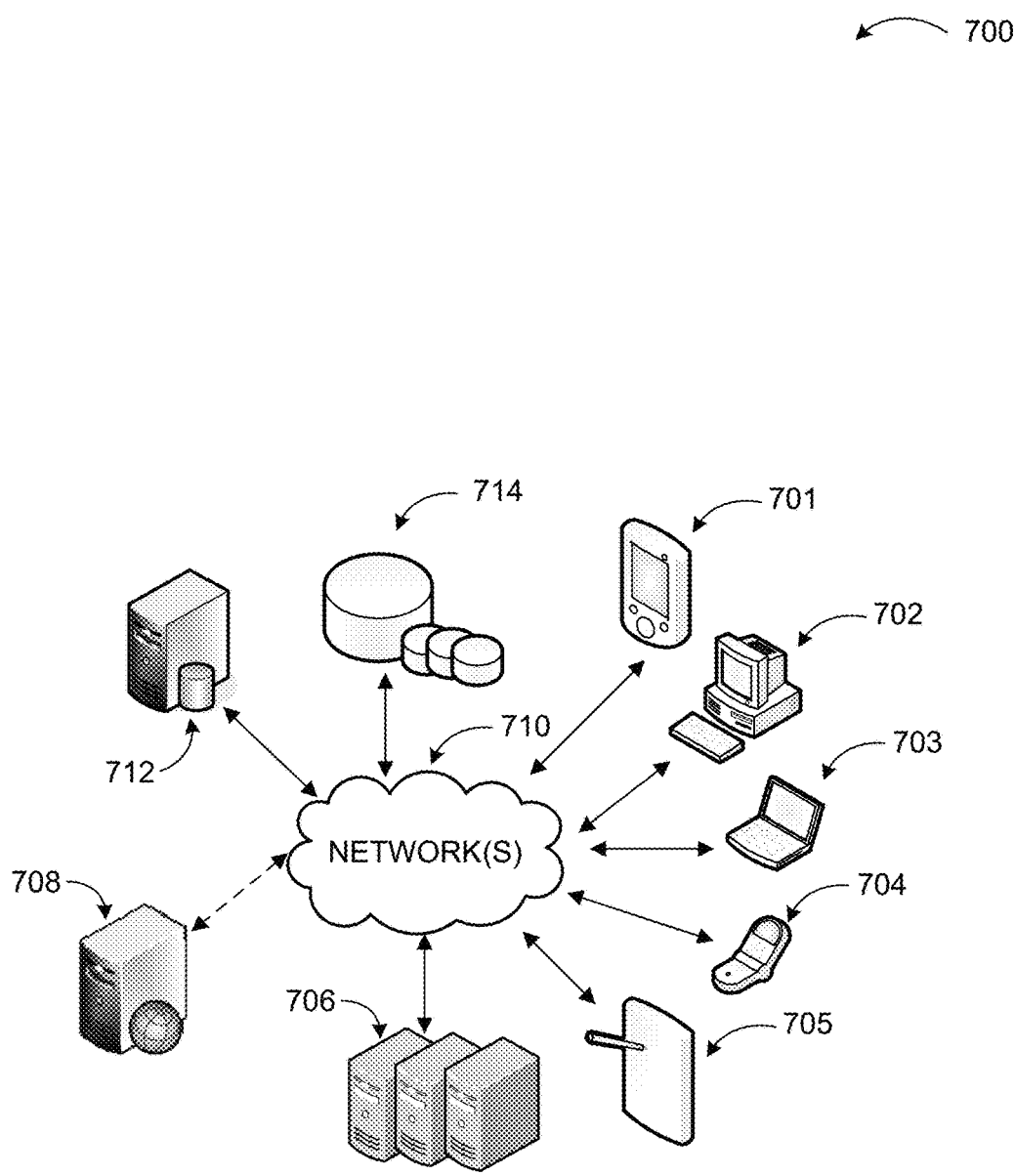
FIG. 7 is a networked environment, where a system according to embodiments may be implemented.

FIG. 7 is a networked environment, where a system according to embodiments may be implemented. In addition to locally installed applications, such as application 822 discussed below, re-ordering of conversation components when the conversation is transmitted in a new message with enrichment features may also be implemented in conjunction with hosted applications and services that may be implemented via software executed over one or more servers 706 or individual server 708. A hosted service or application may communicate with client applications on individual computing devices such as a handheld computer 701, a desktop computer 702, a laptop computer 703, a smart phone 704, a tablet computer (or slate), 705 ('client devices') through network(s) 710 and control a user interface presented to users.

Client devices 701-705 are used to access the functionality provided by the hosted service or application. One or more of the servers 706 or server 708 may be used to provide a variety of services as discussed above. Relevant data may be stored in one or more data stores (e.g. data store 714), which may be managed by any one of the servers 706 or by database server 712.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks such as PSTN or cellular networks. Network(s) 710 provides communication between the nodes described herein. By way of example, and not limitation, network(s) 710 may include wireless media such as acoustic, RF, infrared and other wireless media.

Many other configurations of computing devices, applications, data sources, and data distribution systems may be employed to provide re-ordering of conversation components when the conversation is transmitted in a new message with enrichment features. Furthermore, the networked environments discussed in FIG. 7 are for illustration purposes only. Embodiments are not limited to the example applications, modules, or processes.

Figure 8:
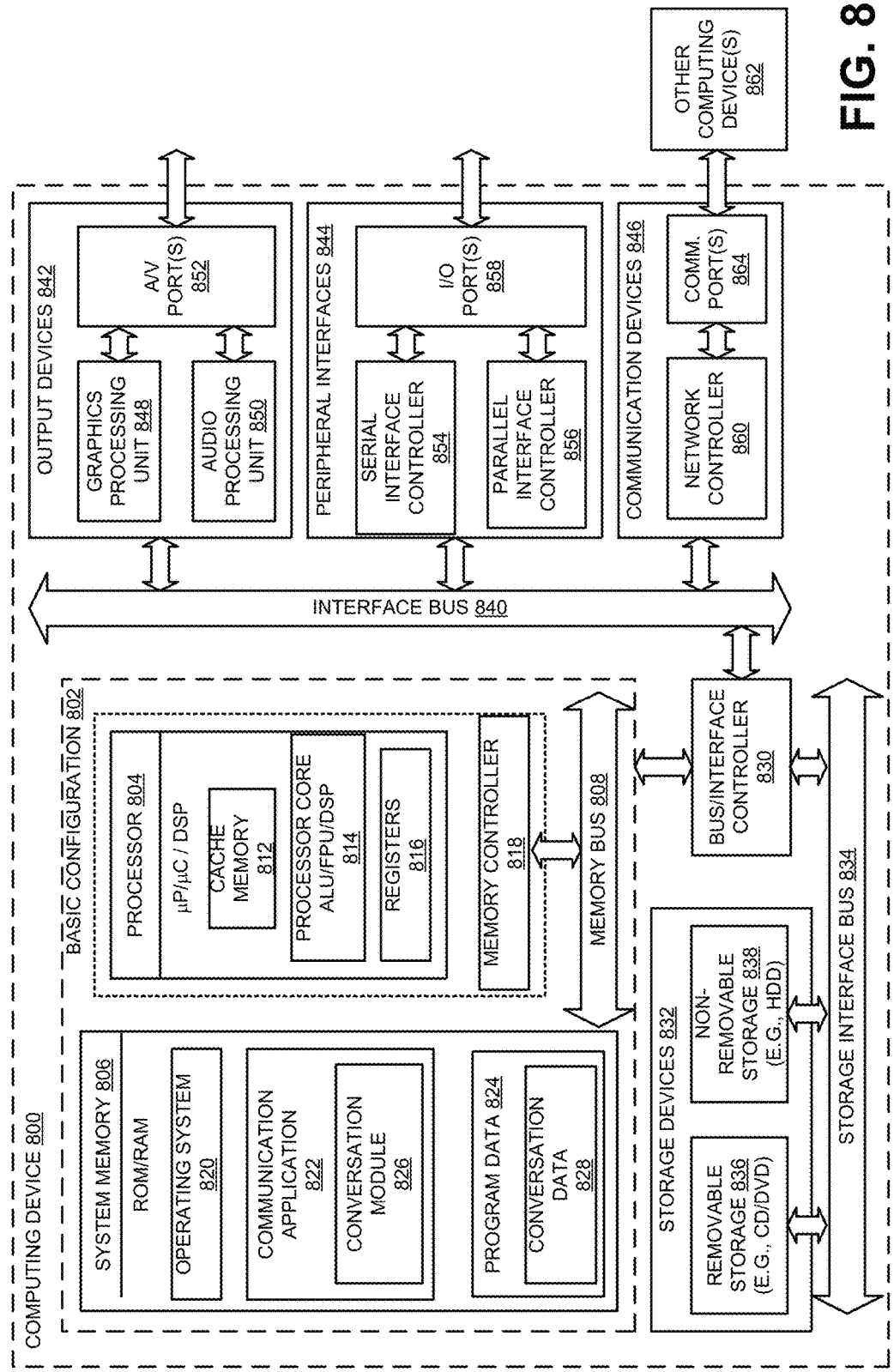
FIG. 8 is a block diagram of an example general purpose computing device, which may be used to provide chronological re-ordering of conversation components when the conversation is transmitted in a new message with enrichment features.

FIG. 8 is a block diagram of an example general purpose computing device, which may be used to provide re-ordering of conversation components when the conversation is transmitted in a new message with enrichment features.

For example, computing device 800 may be used as a server, desktop computer, portable computer, smart phone, special purpose computer, or similar device. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor (µP), a microcontroller (µC), a digital signal processor (DSP), or any combination thereof. The processor 804 may include one more levels of caching, such as a level cache memory 812, one or more processor cores 814, and registers 816. The example processor cores 814 may (each) include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, a communication application 822, and program data 824. The communication application 822 may include a conversation module 826, which may be an integrated module of the communication application 822. In addition to managing conversations, facilitating data collection and analysis, and managing stored conversation data associated with the communication application 822, the conversation module 826 may be configured to analyze components of conversations, re-order the components chronologically keeping a forwarded or replied message on top, and enhance the presentation through enrichment features, as described herein. The conversation module 826 may include specialized components, such as a data collection and an analysis engine, among other components. The program data 824 may include, among other data, conversation data 828, as described herein.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one or more peripheral interfaces 844, and one or more communication devices 846) to the basic configuration 802 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, etc.) via one or more I/O ports 858. An example communication device 846 includes a network controller 860, which may be arranged to facilitate communications with one or more other computing devices 862 over a network communication link via one or more communication ports 864. The one or more other computing devices 862 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer that includes any of the above functions. The computing device 800 may also be implemented as a personal computer including both laptop computer and non-laptop computer configurations.

Example embodiments may also include methods for re-ordering of conversation components when the conversation is transmitted in a new message with enrichment features. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 9:
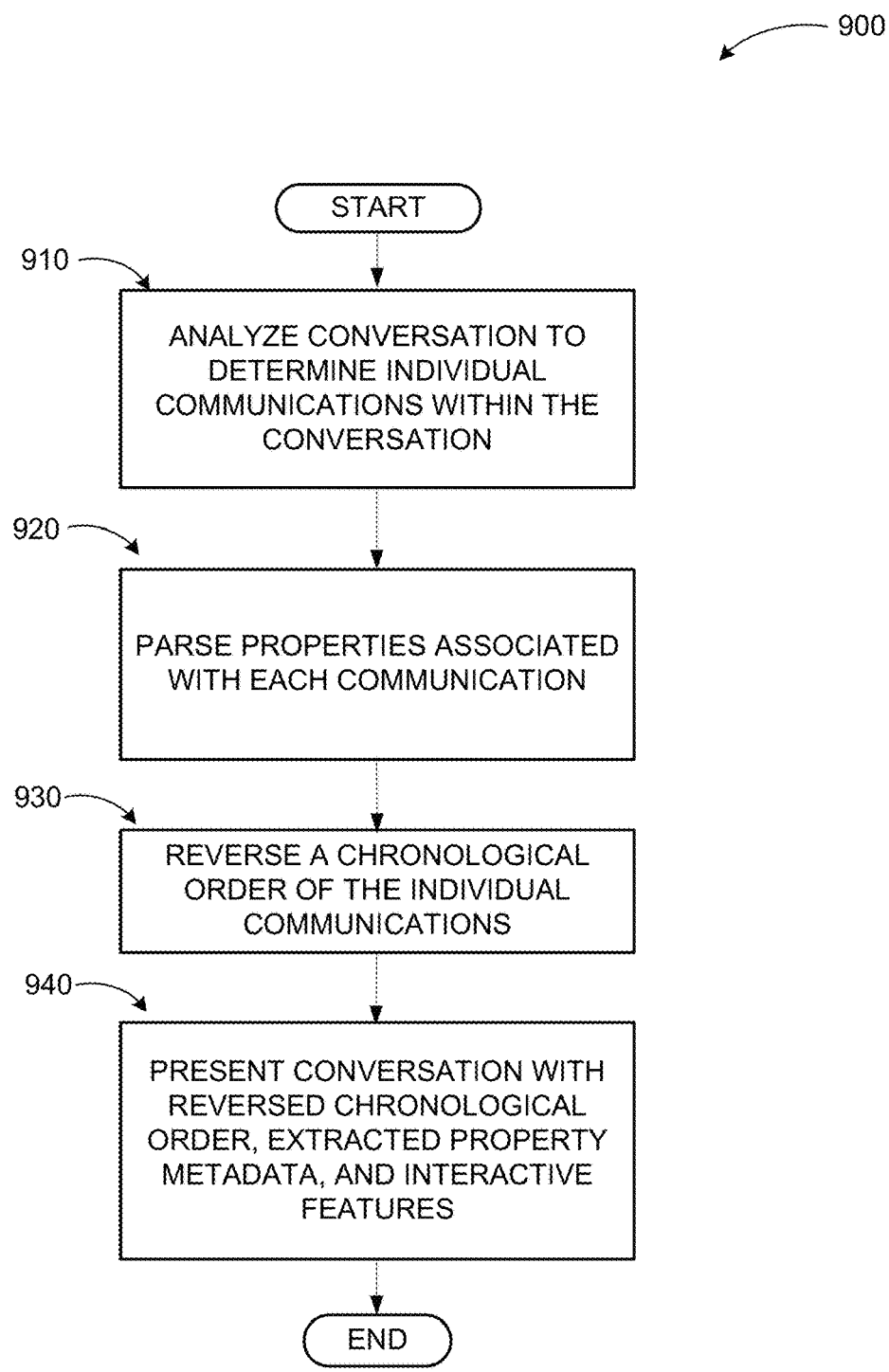
FIG. 9 illustrates a logic flow diagram of a method to provide conversation modification for enhanced user experience, according to embodiments.

FIG. 9 illustrates a logic flow diagram of a method to modify conversations for enhanced user interaction, according to embodiments.

Process 900 may be implemented on a computing device, server, or other system. An example system may include a communication application installed on a device, where a conversation module is integrated with the application. The conversation module may include specialized components, such as a data collection and analysis engine, among other components.

Process 900 begins with operation 910, where the conversation module may analyze a conversation and detect individual communications within the conversation such as emails. In the original conversation, the communications may be in reverse chronological order. In the email example, the conversation may be in simple text or html format. At operation 920, the conversation module may parse properties associated with each communication such as sender, recipients, date and time of transmission, whether new people were added to or existing people removed from the conversation. Other properties that may be extracted may include signatures, advertisements, and other content. In some embodiments, content may be analyzed to provide a summary of each communication.

At operation 930, the conversation module may reverse the chronological order of the conversation such that oldest message is presented at the top. In other embodiments, a most recent communication may be presented at the top followed by the remainder of messages in chronological order such that a conversation participant can read the most recent communication first, then follow the chronological order from the beginning of the conversation.

At operation 940, the conversation may be presented by the communication application in reverse chronological order with enhanced features such as interactivity added using the extracted properties.

Figure 10:
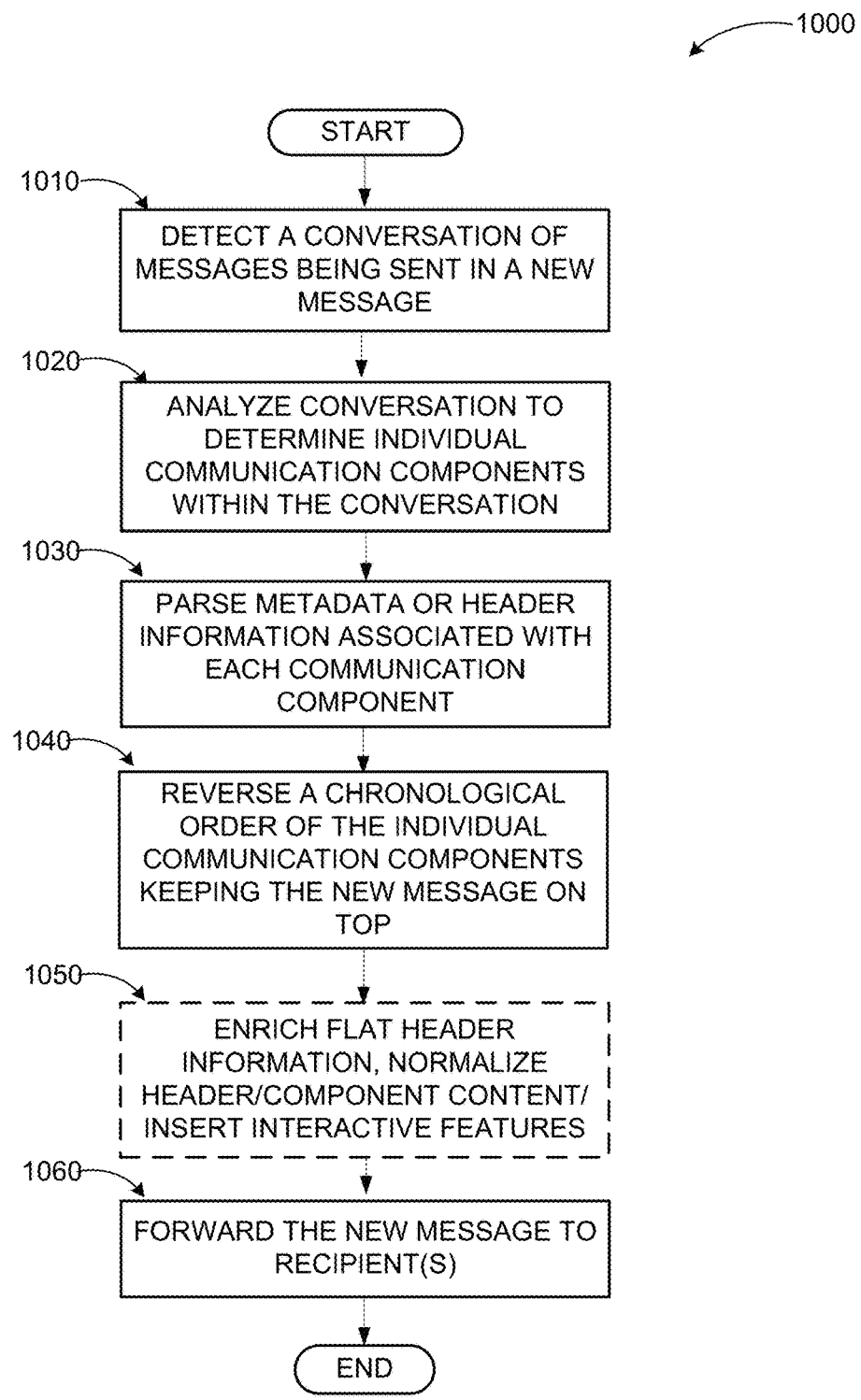
FIG. 10 illustrates a logic flow diagram of a method to provide chronological re-ordering of conversation components when the conversation is transmitted in a new message with enrichment features according to embodiments.

FIG. 10 illustrates a logic flow diagram of a method for re-ordering of conversation components when the conversation is transmitted in a new message with enrichment features, according to embodiments.

Process 1000 may also be implemented on a computing device, server, or other system. An example system may include a communication application installed on a device, where a conversation module is integrated with the application. The conversation module may include specialized components, such as a data collection and analysis engine, among other components.

Process 1000 begins with operation 1010, where the conversation module may detect a conversation of messages being sent in a new message through a forward action, a reply action, or addition of a new person to the conversation. At operation 1020, the conversation may be analyzed to determine the individual components (messages) within the conversation. Some messages may have rich metadata (links or elements associated with interactive information). Other messages may be flat (text form only). At operation 1030, the metadata or headers of the individual components may be parsed to determine attributes or properties of the individual messages such as sender, recipients, send date/time, receive date/time, etc.

At operation 1040, the individual messages may be re-ordered chronologically from old to new, but the newest message sending the conversation may be kept on top to provide context to recipients. At optional operation 1050, flat headers may be enriched with interactive features, headers and/or content of the messages may be normalized to present the overall conversation consistently, and additional interactive features such as summary information, individual collapse/expand elements, and similar ones may be added. At operation 1060, the re-ordered and optionally enriched new message may be provided to its recipient(s).

The operations included in processes 900 and 1000 are for illustration purposes. Methods according to embodiments may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing conversation modification for enhanced user experience is described. The means may include means for analyzing a conversation to determine individual messages within the conversation; means for parsing properties associated with the individual messages; means for determining one or more interactive features to be presented based on the parsed properties; means for reversing a chronological order of the individual messages based on the parsed properties; and means for presenting the conversation with the reversed chronological order and the one or more interactive features.

According to some examples, a computing device to provide conversation modification for enhanced user experience is described. An example computing device may include a memory configured to store instructions and one or more processors coupled to the memory, the one or more processors configured to execute, in conjunction with the instructions stored in the memory, a communication application and a conversation module integrated with the communication application. The conversation module may analyze a conversation to determine individual communications within the conversation; parse properties associated with the individual communications; determine one or more interactive features to be presented based on the parsed properties; and reverse a chronological order of the individual messages based on the parsed properties. The communication application may present the conversation with the reversed chronological order and the one or more interactive features.

According to other examples, the properties may include one or more of a date and time of each individual communication, a sender of each individual communication, recipients of each individual communication, added participants, removed participants, and attachments. The interactive features may include one or more of collapsing and expanding all individual communications, collapsing and expanding select individual communications, providing a summary of the conversation, emphasizing portions of the conversation, enabling customization of an order of the individual communications. The summary of the conversation may include one or more interactive elements to provide additional details about the conversation upon selection.

According to further examples, the collapsed and expanded individual communications may be presented with one or more interactive elements to enable toggling of a collapse/expansion state of the individual communications. The conversation module may be further configured to remove one or more advertisements from the conversation. The conversation module may also be configured to remove one or more signature blocks from the conversation. The conversation module may be configured to analyze the conversation by parsing content and tags of an html body of the conversation. The conversation module may be further configured to analyze the conversation by parsing content and tags of a text body of the conversation. The conversation module may also be configured to analyze the conversation by analyzing metadata associated with the individual communications. The individual communications may include one or more of email messages, text messages, video messages, online conference recordings, desktop sharing sessions, and application sharing sessions.

According to other examples, a method executed at least in part in a computing device to provide conversation modification for enhanced user experience is described. The method may include analyzing a conversation to determine individual messages within the conversation; parsing properties associated with the individual messages; determining one or more interactive features to be presented based on the parsed properties; reversing a chronological order of the individual messages based on the parsed properties; and presenting the conversation with the reversed chronological order and the one or more interactive features.

According to some examples, the properties may include one or more of: a date and time of each individual message, a sender of each individual message, recipients of each individual message, added participants, removed participants, and attachments; and the one or more interactive features may include one or more of collapsing and expanding all individual messages, collapsing and expanding select individual messages, providing a summary of the conversation, emphasizing portions of the conversation, enabling customization of an order of the individual messages.

According other examples, the method may also include employing one or more of a graphical scheme, a highlighting scheme, a textual scheme, a color scheme, and a shading scheme to provide the summary of the conversation and to emphasize the portions of the conversation. The method may further include removing content from the conversation, the content including one or more of advertisements, newsletter content, and signature blocks. The method may yet include prompting a user for confirmation prior to removing the content and/or presenting one or more interactive elements to enable temporary or persistent display of detailed information associated with content of the conversation and properties of the individual messages.

According to further examples, a computer readable memory device with instructions stored thereon to provide conversation modification for enhanced user experience is described. The instructions may include analyzing a conversation to determine individual messages within the conversation, where the individual messages are listed according to an newer-to-older chronological order; parsing properties associated with the individual messages; determining one or more interactive features to be presented based on the parsed properties; determining an order of the individual messages based on the parsed properties; and presenting the conversation with the new order and the one or more interactive features.

According to some examples, the new order may include an older-to-newer chronological order or a custom order. The custom order may include a newest message at a top of the conversation and remaining messages following the older-to-newer chronological order.

According to examples, a means for providing chronological re-ordering of transmitted conversation components is described. The means may include a means for detecting a conversation that includes a sequence of messages being transmitted in a new message; a means for analyzing the conversation to determine individual messages within the conversation; a means for parsing non-content information associated with the individual messages; a means for re-ordering the sequence of messages by reversing a chronological order of the individual messages except for the new message, and preserving a placement of the new message at a top of the sequence of messages; a means for inserting one or more interactive elements based on the parsed non-content information to one or more individual messages; and a means for transmitting the new message with the re-ordered sequence of messages to one or more recipients.

According to some examples, a server to provide chronological re-ordering of transmitted conversation components is described. The server may include a communication interface configured to facilitate exchange of messages with other computing devices; a memory configured to store instructions; and one or more processors coupled to the memory and the communication interface. The one or more processors may be configured to execute, in conjunction with the instructions stored in the memory, a communication service and a conversation module integrated with the communication service. The conversation module may be configured to detect a conversation that includes a sequence of messages being transmitted in a new message; analyze the conversation to determine individual messages within the conversation; parse non-content information associated with the individual messages; re-order the sequence of messages by reversing a chronological order of the individual messages except for the new message and preserving a placement of the new message at a top of the sequence of messages; and transmit the new message with the re-ordered sequence of messages to one or more recipients via the communication interface.

According to other examples, the non-content information includes one or more of: a date and time of each individual message, a sender of each individual message, recipients of each individual message, an added participant, a removed participant, a signature block, a slogan block, and an attachment. The conversation module may be configured to parse the non-content information by retrieving interactive content associated with rich metadata for a subset of the individual messages. The conversation module may also be configured to parse the non-content information by determining one or more resources associated with flat message header content for another subset of the individual messages and retrieving interactive content associated with the flat message header content from the one or more resources. The conversation module may be further configured to insert one or more interactive elements associated with the retrieved interactive content.

According to further examples, the conversation module may be configured to retrieve the interactive content associated with the flat message header content from the one or more resources by performing a search based on parsed flat message header content. The interactive content may include one or more of presence information, contact information, and calendar information. The conversation module may be configured to collapse the chronologically reversed sequence of messages. The conversation module may also be configured to collapse the chronologically reversed sequence of messages by inserting interactive elements in place of textual content of individual message headers and removing signature and slogan blocks. The conversation module may be configured to detect the conversation being transmitted in the new message through one of a forward action, a reply action, and an addition of a new participant to the conversation. The individual messages may include one or more of email messages, text messages, video messages, online conference recordings, desktop sharing sessions, and application sharing sessions.

According to other examples, a method executed at least in part in a computing device to provide chronological re-ordering of transmitted conversation components is described. The method may include detecting a conversation that includes a sequence of messages being transmitted in a new message; analyzing the conversation to determine individual messages within the conversation; parsing non-content information associated with the individual messages; re-ordering the sequence of messages by reversing a chronological order of the individual messages except for the new message, and preserving a placement of the new message at a top of the sequence of messages; inserting one or more interactive elements based on the parsed non-content information to one or more individual messages; and transmitting the new message with the re-ordered sequence of messages to one or more recipients.

According to some examples, the method may also include normalizing a presentation of the individual messages in the conversation. Normalizing the presentation of the individual messages may include modifying one or more of a font, a format, an indentation, and a displayed content amount of each individual message for consistent presentation. Inserting the one or more interactive elements may include providing one or more element for collapsing and expanding all individual messages, collapsing and expanding select individual messages, providing a summary of the conversation, emphasizing portions of the conversation, enabling customization of an order of the individual messages.

According to yet other examples, the method may include detecting an addition of a new participant to the conversation; detecting a message exchanged between the new participant and an existing conversation participant; and inserting the message into the conversation. Inserting the message into the conversation may include placing the message in the sequence of messages according to the message's send date and time and the reversed chronological order.

According to further examples, a computer readable memory device with instructions stored thereon to provide chronological re-ordering of transmitted conversation components is described. The instructions may include detecting a conversation that includes a sequence of messages being transmitted in a new message through one of a forward action, a reply action, and an addition of a new participant to the conversation; analyzing the conversation to determine individual messages within the conversation; parsing non-content information associated with the individual messages; re-ordering the sequence of messages by reversing a chronological order of the individual messages except for the new message, and preserving a placement of the new message at a top of the sequence of messages; inserting one or more interactive elements based on the parsed non-content information to one or more individual messages; normalizing a presentation of the individual messages in the conversation; and transmitting the new message with the re-ordered sequence of messages to one or more recipients.

According to other examples, the instructions may further include collapsing a portion of the sequence of messages based on an available display area at a recipient computing device by replacing at least a portion of textual content of the individual messages with the one or more interactive elements. The portion of the sequence of messages may include the chronologically reversed sequence of messages except the new message.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A server to provide chronological re-ordering of transmitted conversation components, the server comprising:
one or more processors coupled to a memory storing instructions, the one or more processors configured, through execution of one or more instructions stored in the memory, to:
detect a conversation that includes a sequence of messages;
analyze the conversation to identify individual messages of the conversation contained within a body of a latest message of the sequence of messages;
parse properties of the individual messages by analyzing content of the sequence of messages and non-content information associated with the sequence of messages;
re-order the sequence of messages based on the parsed properties by placing the latest message at a top of the sequence of messages and reversing a chronological order of the remaining individual messages of the conversation below the latest message from old to new; and
display the conversation within the body of the latest message with the re-ordered sequence of messages.

2. The server of claim 1, wherein the non-content information associated with the sequence of messages includes one or more of: a date and time of each individual message, a sender of each individual message, a recipient of each individual message, an added participant to the conversation, a removed participant from the conversation, a signature block, a slogan block, and an attachment.

3. The server of claim 1, wherein the one or more processors are configured to analyze the non-content information associated with the sequence of messages by retrieving interactive content associated with metadata for a subset of the individual messages.

4. The server of claim 3, wherein the one or more processors are configured to analyze the non-content information associated with the sequence of messages by determining one or more resources associated with a flat message header content for another subset of the individual messages and retrieving interactive content associated with the flat message header content from the one or more resources.

5. The server of claim 4, wherein the one or more processors are further configured to insert one or more interactive elements associated with the retrieved interactive content.

6. The server of claim 4, wherein the one or more processors are further configured to retrieve the interactive content associated with the flat message header content from the one or more resources by performing a search based on analyzed flat message header content.

7. The server of claim 4, wherein the interactive content includes one or more of presence information, contact information, and calendar information.

8. The server of claim 1, wherein the one or more processors are configured to collapse the chronologically reversed remaining individual messages of the conversation.

9. The server of claim 8, wherein the one or more processors are configured to collapse the chronologically reversed remaining individual messages of the conversation by inserting interactive elements in place of textual content of individual message headers and removing signature and slogan blocks.

10. The server of claim 1, wherein the one or more processors are configured to detect the conversation through one of a forward action, a reply action, and an addition of a new participant to the conversation.

11. The server of claim 1, wherein the individual messages include at least one selected from a group consisting of a text message, a video message, an online conference recording, a desktop sharing session, and an application sharing session.

12. A method executed at least in part in a computing device to provide chronological re-ordering of transmitted conversation components, the method comprising:
 detecting a conversation that includes a sequence of messages;
 analyzing the conversation to identify individual messages of the conversation contained within a body of a latest message;
 parsing properties of the individual messages by analyzing content of the sequence of messages and non-content information associated with the sequence of messages;
 re-ordering the sequence of messages based on the parsed properties by placing the latest message at a top of the sequence of messages and reversing a chronological order of remaining individual messages of the conversation below the latest message from old to new;
 inserting one or more interactive elements to one or more individual messages based on the parsed properties; and
 displaying the conversation within the body of the latest message with the re-ordered sequence of messages.

13. The method of claim 12, further comprising:
 normalizing a presentation of the individual messages of the conversation.

14. The method of claim 13, wherein normalizing the presentation of the individual messages comprises:
 modifying one or more of a font, a format, an indentation, and a displayed content amount of at least one individual message for consistent presentation.

15. The method of claim 12, wherein inserting the one or more interactive elements comprises:
 providing one or more elements for collapsing and expanding all individual messages, collapsing and expanding select individual messages, providing a summary of the conversation, emphasizing portions of the conversation, and enabling customization of an order of the individual messages.

16. The method of claim 12, further comprising:
 detecting an addition of a new participant to the conversation;
 detecting a message exchanged between the new participant and an existing conversation participant; and
 inserting the message into the conversation.

17. The method of claim 16, wherein inserting the message into the conversation comprises:
 placing the message in the sequence of messages according to a send date and time of the message and the reversed chronological order.

18. A computer readable memory device with instructions stored thereon to provide chronological re-ordering of transmitted conversation components, the instructions comprising:
 detecting a conversation that includes a sequence of messages;
 analyzing the conversation to identify individual messages of the conversation contained within a body of a latest message;
 parsing properties of the individual messages by analyzing content of the sequence of messages and non-content information associated with the sequence of messages;
 re-ordering the sequence of messages based on the parsed properties by placing the latest message at a top of the sequence of messages and reversing a chronological order of remaining individual messages of the conversation below the latest message from old to new;
 inserting one or more interactive elements to one or more individual messages based on the parsed properties;
 normalizing a presentation of the individual messages of the conversation; and
 displaying the conversation within the body of the latest message with the re-ordered sequence of messages.

19. The computer readable memory device of claim 18, wherein the instructions further comprise collapsing a portion of the sequence of messages based on an available display area at a recipient computing device by replacing at least a portion of textual content of the more interactive individual messages with the one or elements.

* * * * *